United States Patent
Håål et al.

(10) Patent No.: US 6,237,041 B1
(45) Date of Patent: May 22, 2001

(54) SYSTEM USING INTEGRATING SERVER FOR TRANSFORMING MESSAGE FROM ONE SYSTEM-SPECIFIC NATIVE FORMAT TO ANOTHER SYSTEM SPECIFIC FORMAT ACCORDING TO DESCRIPTION OF CLIENT COMPUTERS

(75) Inventors: Anders Håål, Stockholm; Torbjörn Ryeng, Lidingö, both of (SE)

(73) Assignee: Corus Technologies Aktiebolag, Stockholm (SE)

( * ) Notice: Subject to any disclaimer, the term of this patent is extended or adjusted under 35 U.S.C. 154(b) by 0 days.

(21) Appl. No.: 09/211,462

(22) Filed: Dec. 14, 1998

(30) Foreign Application Priority Data

Oct. 20, 1998 (SE) .................................. 9803579-3

(51) Int. Cl.[7] ..................................................... G06F 15/16
(52) U.S. Cl. ........................................... 709/246; 709/203
(58) Field of Search ................................... 709/246, 203, 709/249, 253; 710/21

(56) References Cited

U.S. PATENT DOCUMENTS 5,490,252 * 2/1996 Macera et al. ........................ 709/249
5,499,341 * 3/1996 Wilson et al. ........................... 710/21
6,076,117 * 6/2000 Billings ................................. 709/253

FOREIGN PATENT DOCUMENTS 2191640    11/1996  (CA) .
0 130 375   9/1985  (EP) .
93/23817   11/1993  (WO) .

* cited by examiner

Primary Examiner—Le Hien Luu
(74) Attorney, Agent, or Firm—Pearne & Gordon LLP

(57) ABSTRACT

The invention concerns a device for and a method of integrating an arrangement of computerised essentially arbitrary client systems (2) by permitting communication between the client systems. Each client system has a system-specific structure and processes information in a system-specific native format. The device comprises an integrating server (4) and a number of communication connections each connecting one client system to the integrating server (4) for the exchange of a message between said client systems and the server. The integrating server (4) comprises transformation means for transforming said message published by each client system (2) in the system-specific native format to a transformation format permitting subscription of said message by any other client system. Furthermore, the device comprises a tool (3) having means (31) for inputting a description of each client system, means (32) for storing said description, and means (33) for automatically generating from said description the transformation means of the integrating server.

25 Claims, 5 Drawing Sheets

SYSTEM USING INTEGRATING SERVER FOR TRANSFORMING MESSAGE FROM ONE SYSTEM-SPECIFIC NATIVE FORMAT TO ANOTHER SYSTEM SPECIFIC FORMAT ACCORDING TO DESCRIPTION OF CLIENT COMPUTERS

THE BACKGROUND OF THE INVENTION AND PRIOR ART

The present invention refers to a device for and a method of integrating an arrangement of a number of computerised essentially arbitrary client systems, being independent of each other, by permitting communication between the client systems, each client system having a system-specific structure and being adapted to process information in a system-specific native format.

Furthermore, the invention refers to a method of integrating an arrangement of a number of computerised essentially arbitrary client systems, being independent of each other, by permitting communication between the client systems, each client system having a system-specific structure and being adapted to process information in a system-specific native format, Today, firms and organisations frequently rely for their daily processes on a number of different software applications on one or several hardware structures, i.e. computerised client systems, which are operating independently of each other. There is a need to integrate such client systems to make them co-operate and exchange data. Such integration is provided by connecting pairs of client systems to each other at a low system level by means of translation programs using different communication protocols. However, in order to obtain a global integration of the different client systems a myriad of specialised system-to-system programs is provided. The result is a spaghetti-like tangle of complex system inter-dependencies forming an effective gridlock for any further system development. Moreover, since the different client systems may not operate independently of each other any longer, the performance and the efficiency of each system is significantly reduced.

It has been proposed to integrate a number of independent client systems by the provision of an integrating server to which all of said client systems are connected. However, such an integrating server quickly grows to a very complicated client system which requires a considerable amount of computer programming work. In addition, such an integrating server need to be modified each time a new client system is to be integrated, or when a software application or a hardware structure is upgraded or replaced in any of the client systems.

SUMMARY OF THE INVENTION

The object of the present invention is to improve the possibilities of integrating different essentially arbitrary computerised client systems. In particular, it is aimed at an integration which permit the client systems to remain independent although integrated with each other, and thus efficient, changeable and replaceable.

This object is obtained by a device for integrating an arrangement of a number of computerised essentially arbitrary client systems, being independent of each other, by permitting communication between the client systems, each client system having a system-specific structure and being adapted to process information in a system-specific native format,
wherein the device comprises an integrating server and a number of communication connections for the exchange of a message, derived from said information, between the client systems and said integrating server, each communication connection being provided to connect a client system to said integrating server and comprising a client adapter adapted to the system-specific format and the system-specific structure of the respective client system for the exchange of said message in the system-specific native format, and a server adapter for the exchange of said message in the respective system-specific native format with said integrating server, said integrating server comprising a transformation means arranged to transform said message published by a client system in the system-specific native format to another system-specific format permitting subscription of said transformed message by any other of the client systems, and
a tool for staging the integration comprising means for inputting a description of each of the client systems, means for storing said description, and
means for generating in an automatic manner with the aid of said description said transformation means of said integrating server, said client adapter and said server adapter.

By such a description of each client system, which is stored in said storing means, for instance a so called repository database forming a meta model of the different client systems, the generating means is realized as a computer program and may generate the source code files forming the transformation means required to permit the exchange of messages between two different client systems. The repository may remain as a description of all client systems during the operation of the integrated systems. Any change, i.e. upgrading, deletion or replacement, of a client system need only be added to the description, whereafter the transformation means is changed accordingly in an automatic manner by the generating means. Said inputting means, said storing means and said generating means may be formed by a conventional separate personal computer, wherein said inputting means may comprise an interface, especially a graphical user interface, GUI, facilitating the use of the tool. It is also possible to let said inputting means, said storing means and said generating means reside on the hardware structure of the integrating server or even any of the client systems. Said client adapter, which may reside on the respective client system, comprises an interface for the respective client system, which enables the system to publish any information to the integrating server or subscribe on any information from the integrating server. Preferably, said interface is an Application Program Interface, API.

The server adapter may reside on the integrating server and is an interface enabling the communication between the respective client adapter and the integrating server. By the definitions contained in the description the client adapter and the server adapter may be generated in advance as source code files which may be implemented on the hardware structure where the client adapter and the server adapter, respectively, are located.

According to a further embodiment of the present invention, said client adapter comprises at least one first adapter member for transferring said message in the system-specific native format to a respective client system and at least one second adapter member for transferring said message in the native format from the respective client system. Thus, the first adapter member, which may transfer information in only one direction, is a so called outbound adapter arranged to subscribe on information from the integrating server, and the second adapter member, which also may transfer information in only one direction, is a so called inbound adapter arranged to publish information to the integrating server.

According to a further embodiment of the present invention, said server adapter comprises a first adapter member for transferring said message in the system-specific native format from said integrating server and a second adapter member for transferring said message in the system-specific native format to said integrating server. Likewise, the first adapter member, the outbound adapter, is provided to transfer information in only one direction with respect to the integrating server and the second adapter member, the inbound adapter, is provided to transfer information in the other direction with respect to the integrating server. Furthermore, the first adapter member of the server adapter may comprise a filter provided to prevent transfer of the information to a respective client system, which is irrelevant to that system.

According to a further embodiment of the present invention, said client adapter and said server adapter of one communication connection are arranged to communicate with each other by means of an arbitrary data protocol. The communication between said adapters may be performed by any conventional communication link.

According to a further embodiment of the present invention, each communication connection comprises an access means. Such access means may comprise an interface to be adopted by the client system for integration. This interface is tailored for the system structure and the system information at hand.

According to a further embodiment of the present invention, said storing means comprises a primary database arranged to form said description by a number of definitions. Such definitions may contain information on connected client systems, local representations of exchanged information, client system interface characteristics, client system infrastructure etc.

According to a further embodiment of the present invention, a manager unit is provided for monitoring the integrating server and the client adapters. By such a manager unit, the operation of the arrangement may be supervised and certain processes may be initiated. Thereby, said client adapter may comprise a control unit connected to the manager unit and provided for controlling the transfer of data through said client adapter.

According to a further embodiment of the present invention, said integrating server comprises a secondary database which contains a table means for each system-specific native format of the client systems of the arrangement and for each specific type of information to be communicated between client systems. Thereby, said transformation means may comprise at least one software algorithm, provided to transfer a message from one table means of one system-specific native format to another table means of another system-specific native format and thereby to transform the format of said message from said one system-specific format to another system-specific format. Each table means, forming the fundamental information carrying entity of the integrating server, comprises table rows which each contains a piece of information from one of the client systems. At least one table means, forming a base table, may comprise a history log table storing all changes in a table row of said secondary database and an event log table storing all operations concerning the respective table means.

According to further embodiment of the present invention, means is provided to detect a possible error in a message, means is provided to permit the error-containing message to be stored by said secondary database, and means is provided to prevent the error-containing messages from being transferred to another client system unless the error is corrected. In such a manner, an advantageous error handling is obtained, which involves the possibility to operate the arrangement although an error is detected on an operation, and transfer said operation to a client system when the error has been corrected. Thereby, said detecting means may be comprised by a trigger means arranged to initiate storing of the error-containing message on said history log table and on said event log table. The trigger means may comprise a database trigger. Preferably, said permitting means and said preventing means are comprised by said server adapter.

The object is also obtained by a method of integrating an arrangement of a number of computerised essentially arbitrary client systems, being independent of each other, by permitting communication between the client systems, each client system having a system-specific structure and being adapted to process information in a system-specific native format, comprising the steps of:

describing each of the client systems, storing said description, generating in an automatic manner by means of said description an integrating server comprising a transformation means arranged to transform a message published by a client system in the system-specific native format to another system-specific format permitting subscription of said transformed message by any other of the client systems, generating in an automatic manner by means of said description a number of communication connections for the exchange of said message between the client systems and the server, said communication connection comprising a client adapter adapted to the system-specific format and the system-specific structure of the respective client system for the exchange of said message in the system-specific native format, and a server adapter adapted to exchange said message in the respective system-specific native format with said integrating server, and operating the arrangement, whereby information in a system-specific format from one client system is processed in another system-specific format by another client system.

Preferred embodiments of the method are defined in dependent method claims.

BRIEF DESCRIPTION OF THE DRAWINGS

The present invention is now to be described more closely by means of an embodiment thereof and with reference to the drawings attached.

DETAILED DESCRIPTION OF AN EMBODIMENT OF THE PRESENT INVENTION

Figure 1A:
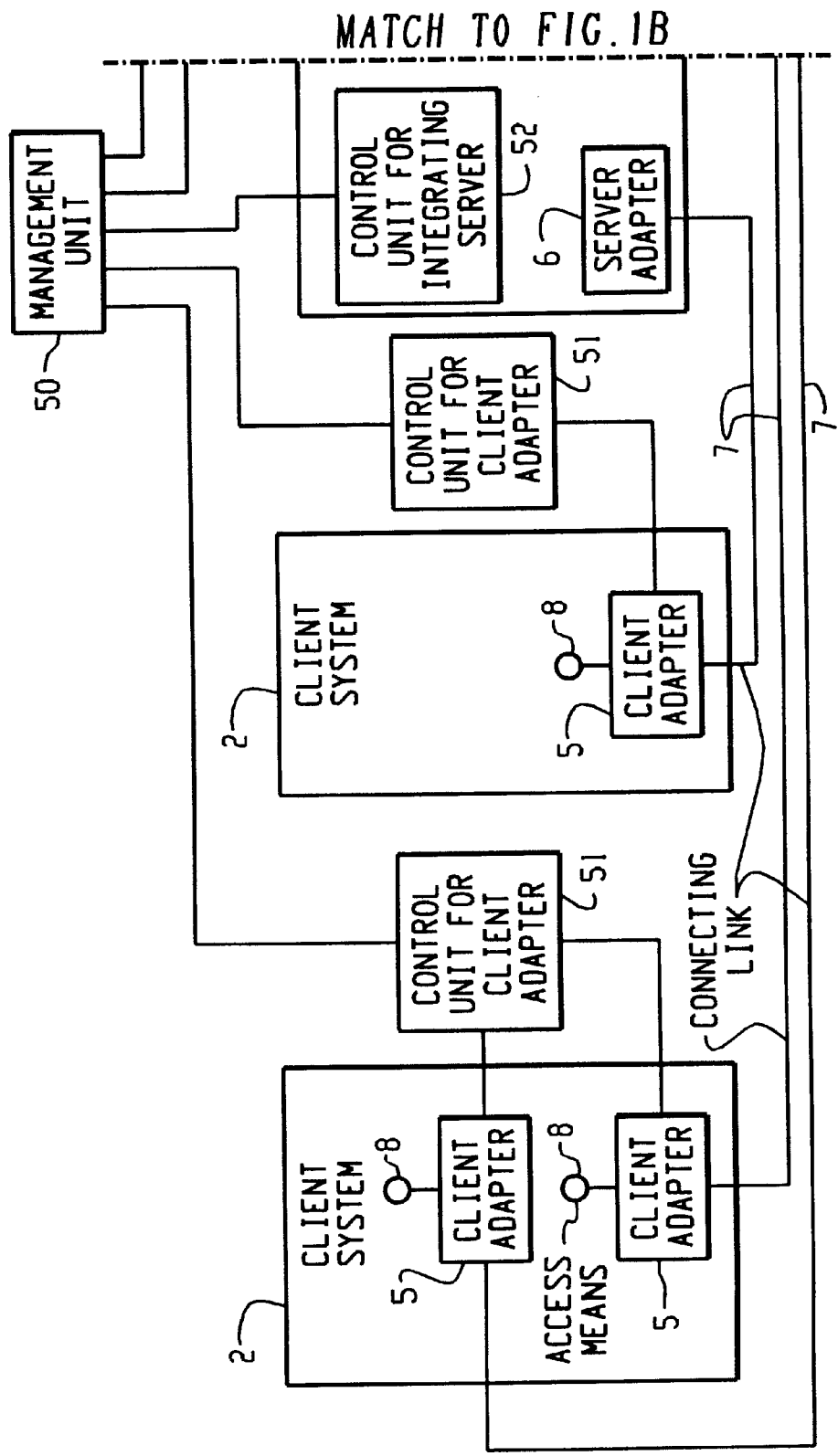
FIG. 1 discloses schematically an arrangement of several computerised client systems.
Figure 1B:
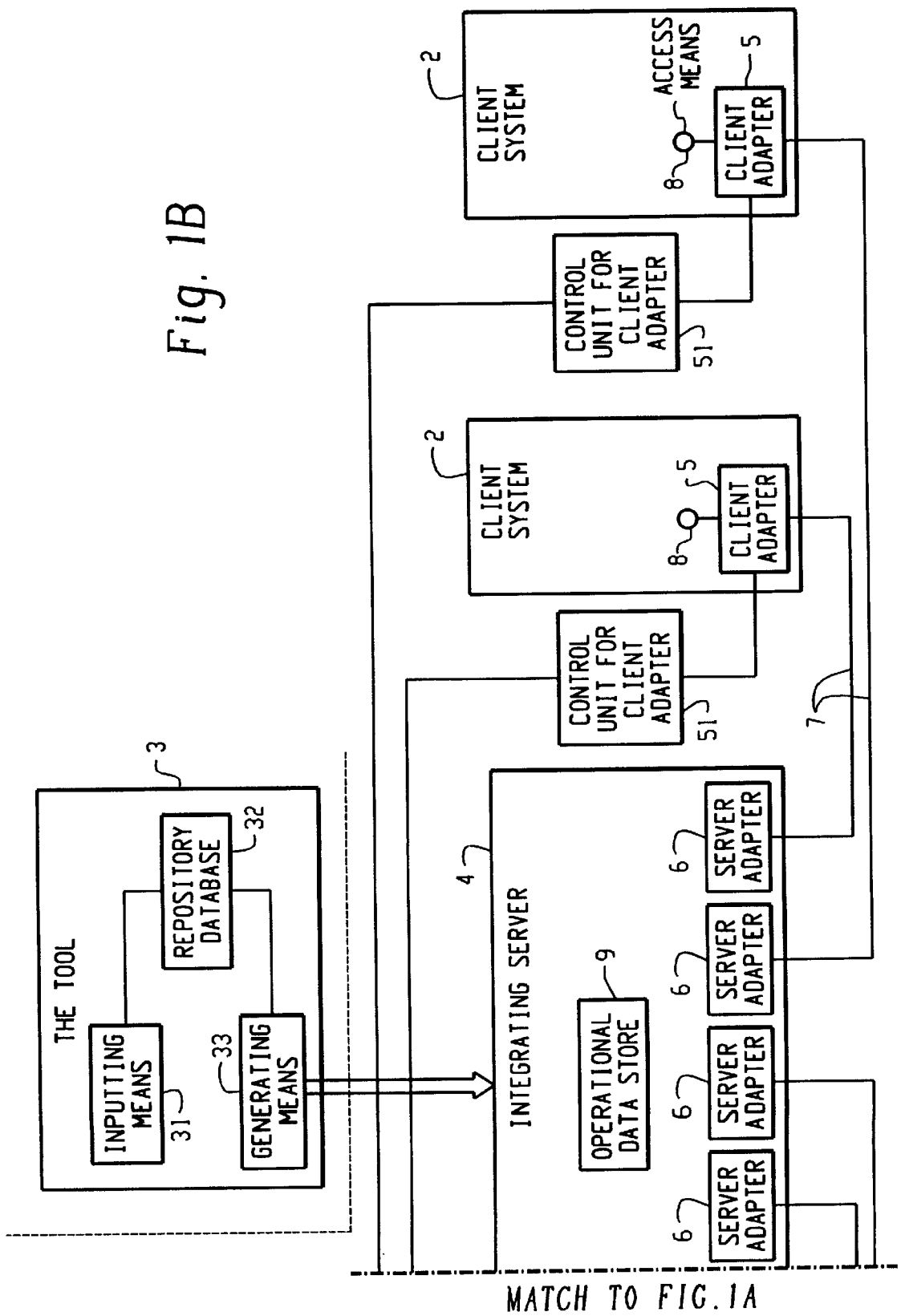

FIG. 1 discloses an arrangement of a number of computerised independent client systems 2. For instance, the client systems 2 may comprise different computer applications within an organisation or a company, such as an order register system, a manufacturing system, a stock handling system, an invoicing system etc. According to the present invention, such client systems 2 may be integrated with each other although permitted to operate independently from each other, i.e. one client system 2 may operate in an efficient manner as if any other of the client systems 2 did not exist. In other words, each client system 2 has a system-specific hardware structure and is adapted to process data and information in a system-specific native format. Furthermore, a tool 3 is provided to generate the components to be implemented onto the arrangement in order to enable such an integration of the client systems 2. The tool 3 is to be described more closely below.

The integrating components for the integration of the arrangement comprise an integrating server 4 and a number of communication connections for the exchange of messages between the client systems 2 and the integrating server 4. Each communication connection is provided to connect one of the client systems 2 to the integrating server 4. The integrating server 4 comprises transformation means to be described more closely below and arranged to transform the messages published by each client system 2 in the system-specific native format to at least one transformation format permitting subscription of the messages by any other client system 2.

Each communication connection comprises a client adapter 5, adapted to the system-specific format and the system-specific structure of the respective client system 2 for the exchange of messages therewith in the system specific native format, a server adapter 6, for the exchange of messages in the respective system-specific native format with the integrating server 4, and a connecting link 7, connecting the client adapter 5 and the server adapter 6 and permitting communication there between by means of an arbitrary data protocol. An access means 8 may be located on a memory means of the respective client system 2 and is provided to perform the basic access functions for making the information on the respective client system 2 available to the integrating server 4 and the information on the integrating server 4 available to the respective client system 2.

The Client Adapter

The client adapter 5 comprises a software product, which may, as is disclosed in FIG. 1, be located on the respective client system 2, i.e. the client adapter 5 may be registered on a memory means of the client system 2. However, it is also possible to locate the client adapter 5 on the integrating server 4, or even any intermediate computer means. The client adapter 5 forms an interface for the respective client system 2, which enables the client system 2 to publish any information to the integrating server 4 or subscribe on any information from the integrating server 4. According to a preferred embodiment of the invention, the interface is an Application Program Interface, API. All information and data communicated between the respective client system 2 and any other client system 2 is transferred through the client adapter 5. Thereby, the client adapter 5 encapsulates all infrastructure and communication protocols of the integrating components from the client system 2 itself.

The integrating server 4 may be connected to a client system 2 via one or more communication connections. As is exemplified for the client system 2, to the left in FIG. 1, two such communication connections may be provided. Thereby, two client adapters 5 may be implemented onto the client system 2. It is to be noted, that complicated and large computer applications may require a large number of client adapters 5 and corresponding communication connections, i.e. a corresponding server adapter 6 for each client adapter 5.

Each communication connection is provided to transfer information and data in only one direction. Therefore, each client adapter 5 comprises, as appears from FIG. 2, one first adapter member 5', a so called outbound client adapter, which is arranged to subscribe on information from the integrating server 4, and a second adapter member 5", a so called inbound client adapter, which is arranged to publish information from the respective client system 2 to the integrating server 4. Each of the first and second adapter members 5', 5" communicates with the respective client system 2 via a first and second, respectively, access member 8', 8".

The major responsibility for the second adapter member 5", the inbound client adapter, is to meet the requirement of a safe asynchronous communication, i.e. the second adapter member 5" comprises a storing means for a local message queue, permitting publishing of messages in an asynchronous manner. Thereby, transfer of messages from the respective client system 2 may be executed outside the context of the respective client system 2. It is to be noted, that transfer of messages also may be performed in a synchronous manner when required for any reason.

The major responsibility of the first adapter member 5', the outbound client adapter, is to meet the requirements of both event driven and poll based subscription of messages. The integrating server 4 transfers all operations to all client systems 2, i.e. the first adapter members 5'. In order to detect such an event, the subscribing client system 2 first registers all events that are of interest for the respective client systems 2. Then, the first adapter member 5' is arranged to suppress the subscription until a registered event is detected. The first adapter member 5' may also contain means for polling the integrating server 4 for changes. Such polling may take place regularly by means of a scheduling mechanism or when information is needed for any process in the respective client system 2.

The Server Adapter

The purpose of the server adapter 6 is to communicate messages to and from the integrating server 4. The server adapters 6 are software products, which are located on a memory means of the integrating server 4 and may comprise an interface. Also the server adapter 6 comprises, as appears from FIG. 2, a first adapter member 6', the outbound server adapter, which transfer messages from the integrating server 4 to subscribing client systems 2, and a second adapter member 6", the inbound server adapter, which receives messages from publishing client systems 2 to the integrating server 4. The first adapter member 6' may comprise a filter means preventing the subscription of messages being irrelevant to the respective client system 2.

The Integrating Server

The integrating server 4 comprises a database 9, which is called operational data store, ODS, and which contains a table means for each system-specific native format of the client systems 2 and for each specific type of information to be communicated between the client systems 2. The integrating server 4 may be located on a separate computer, or on one of the client systems 2 of the arrangement. It is to be noted, that the database 9 of the integrating server 4 is independent from the server adapters 6, i.e. the server adapters 6 are easily replaceable without influencing the function and operation of the database 9.

One of the table means of the database 9 comprises a base table 10, whereas the other table means comprise a respective format table 11. In the embodiment disclosed, the format of the base table 10 is the system-specific native format of at least one of the client systems 2 and functions as a global format of the database 9, whereas each format table 11 represents the format of at least one client systems 2. In such a manner, each client system 2 of the arrangement is represented in the database 9 either by the base table 10 or by a format table 11. It is to be noted, however, that the database 9 may also be configured in other ways, for instance the base table 10 may represent a global format located in the centre of the database 9 and not representing any format of any client system 2 of the arrangement 1. Alternatively, more than one base table 10 may be provided, wherein all the base tables 10 are connected to all other base tables 10.

Figure 2:
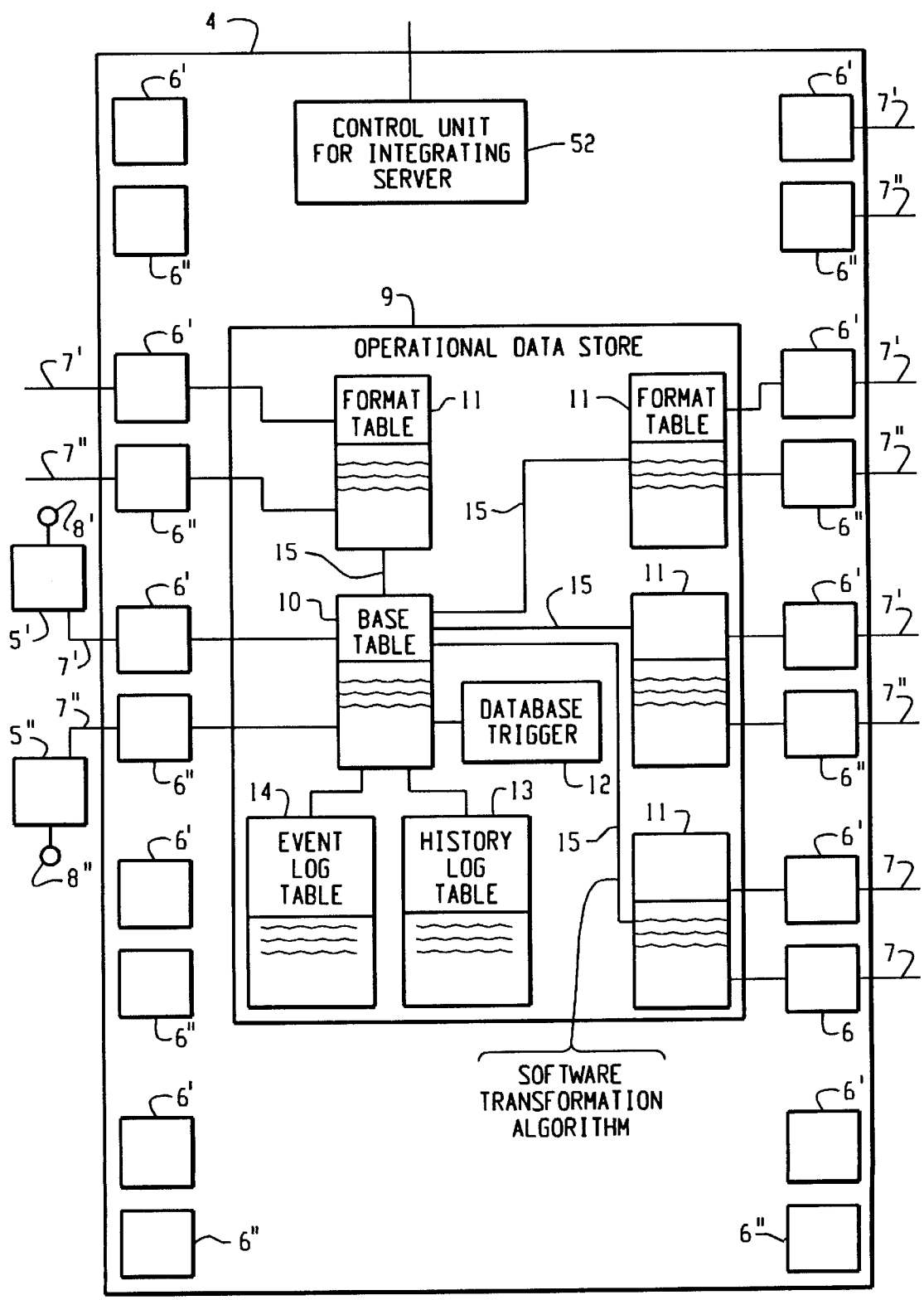
FIG. 2 discloses schematically the structure of an integrating server of the arrangement in FIG. 1.

It is to be noted, that the base table 10 connected to one client system 2, as disclosed in FIG. 2, in reality may be one of a great number of base tables 10 needed by the client system 2, i.e. one for each type of information to be stored. For the sake of simplicity, the following discussion will only consider one base table 10 and one format table 11 for each client system 2. The base table 10 and each format table 11 contain a number of table rows, each row representing an information item. A message from or to a client system 2 thus corresponds to one or several operations on information items in one or more tables 10, 11. Consequently, a message is a piece of information which results in at least one operation in a table row of the base table 10, wherein such an operation may include creating a new table row, deleting an existing table row or updating an existing table row.

The table means comprising the base table 10 also comprises a trigger means 12 in the form of a database trigger, a history log table 13 and an event log table 14. The history log table 13 is provided to store all changes in a table row of the database 9. The event log table 14 is provided to store all operations concerning the respective base table 10 as an event.

Furthermore, the database 9 comprises transformation means in the form of software transformation algorithms 15 illustrated by the thickened lines in FIG. 2 and provided to transfer a message from one table 10, 11 to another table 10, 11. Thereby, the format of the message is transformed from the format of said one table 10, 11 to the format of said another table 10, 11.

The integrating server 4 also comprises means provided to detect a possible error in an operation. Such error detection may be performed by means of the above-defined trigger means 12. The errors may be detected by two types of integrity checks, namely semantic integrity checks, which may be performed on a local table row without information from any other rows in the table or from other tables, and referential integrity checks on a local table row where consistency is checked toward other information sources, ie. other table rows. Furthermore, errors detected may be permitted to be stored in the history log table 13 and the event log table 14. Thereby the table row containing an error is marked so that the subscribing client system 2 knows about the error, Such an error-containing table row may be called a pending event as long as the error is marked and thereby the table row is not available for subscription from the history log table 13 and the event log table 14 until the error is corrected. By means of this solution, the operation of the arrangement, i.e. the communication between the different client systems 2 through the integrating server 4, may continue although error-containing table rows do exist.

Moreover, by storing the errors as pending events in the history log table 13 and the event table 14, correction of the errors by the arrangement itself is made possible and therefore it is believed that the handling of all existing errors at a given point of time will be human manageable.

The Tool

Figure 3:
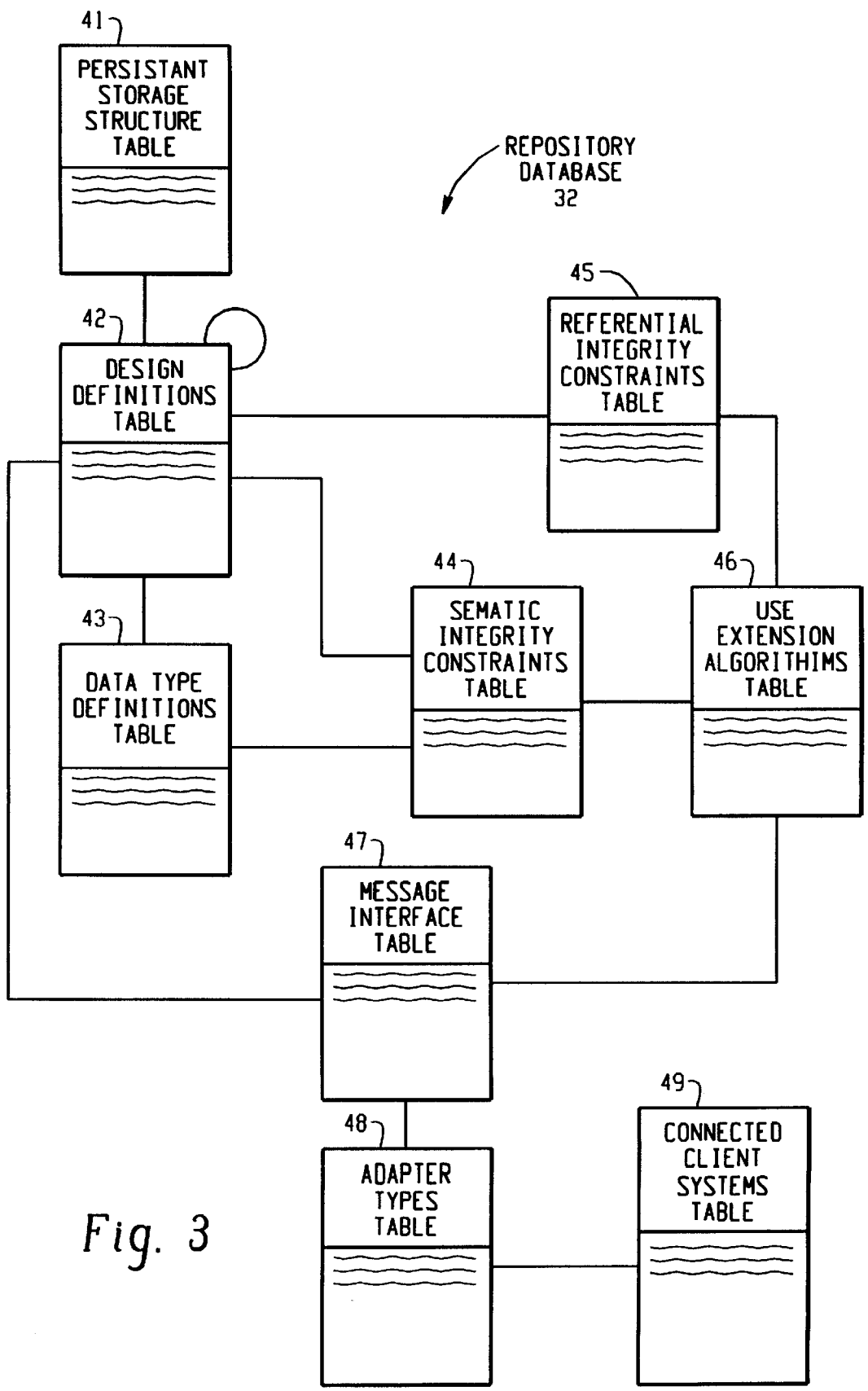
FIG. 3 discloses schematically the structure of the of a repository of the arrangement in FIG. 1.

The tool 3, provided to generate the integrating components of the arrangement, comprises an inputting means 31, a storing means 32 and a generating means 33. The tool 3 comprises software products being stored on a memory means of a computer, for instance a separate personal computer, or of the integrating server 4 or even any of the client systems 2. The inputting means 31 may be realized by a keyboard, a display and an interface, preferably a Graphical User Interface, GUI. The storing means 32 comprises a so called repository database forming a meta model of different client systems 2. The generating means 33 includes software programs provided to generate source code files forming the integrating components, in particular the database 9 of the integrating server 4, the server adapters 6 and the client adapters 5. By the inputting means 31, the different client systems 2, to be connected to the arrangement, are described and stored in the repository database 32. Such a description is formed by a number of definitions including, for instance, information on connected client systems, local representations of exchanged information, client system interface characteristics, client system infrastructure etc. More specifically, the repository database 32 comprises a number of tables, each containing a number of said definitions. FIG. 3 discloses, as an example, a possible configuration of the repository database 32. Table 41 stores the definitions defining the persistent storage structure in the integrating server 4. Table 42 includes the definitions of the design of each column of each table in the integrating server 4. Table 43 includes the data type definitions contained in the database 9 of the integrating server 4. The table 44 defines the semantic integrity constraints provided for local testing of each table row in the tables 10, 11 of the database 9 of the integrating server 4. Table 45 defines the referential integrity constraints provided for referential testing of the table rows in the tables 10, 11 of the database 9 of the integrating server 4. Table 46 defines user extension algorithms for more complicated transformations, checks etc. than those normally provided by the generating means. Table 47 defines a message interface. Table 48 defines the adapter types used. Table 49 defines the connected client systems.

By means of the information stored in these tables 41–49, the generating means 33 generates the different integrating components of the arrangement. In particularly, the generating means 33 sets up the different client adapters 5, the different server adapters 6 and the database 9 of the integrating server 4. Thereafter, these components are implemented on the hardware structure of the respective client system 2 and on the hardware structure forming the location for the integrating server 4, respectively. The tool 3 is not any longer involved in the operation of the arrangement. However, the tool 3 may remain as a part of the arrangement and function as a tool for making changes to the arrangement, such as adaptations to new client systems 2 or updating of existing client systems 2.

In order to monitor the operation of the arrangement 1, there is provided a managing unit 50 to which a control unit 51 for each client adapter 5 and a control unit 52 for the integrating server 4 is connected. The control units 51 are located on the respective client system 2 and the control unit 52 are located on the integrating server 4.

Figure 4:
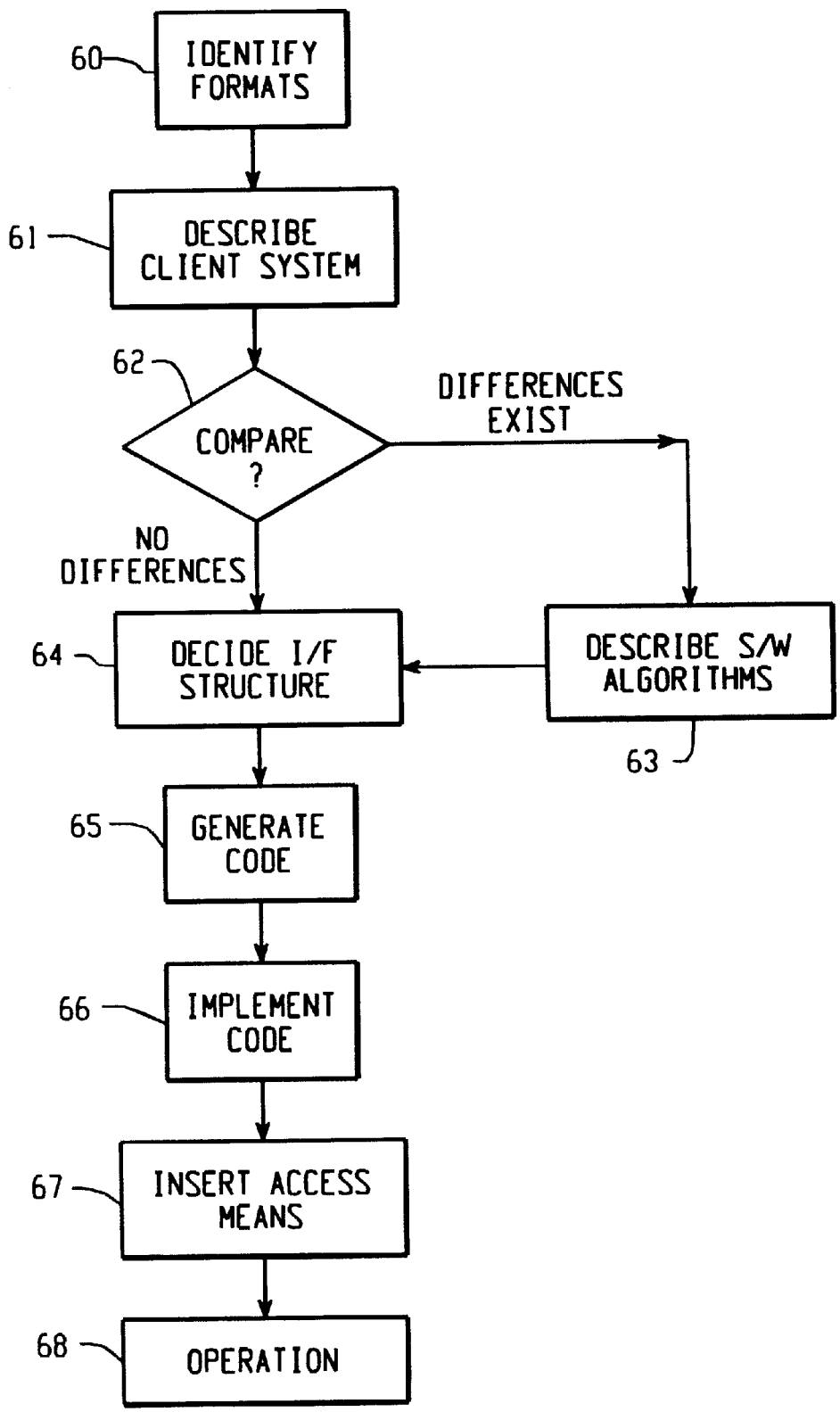
FIG. 4 discloses a flow chart illustrating the integration of the client system.

FIG. 4 discloses a flow chart illustrating, as an example, the various integrating steps for integrating a number of client systems 2.

Box 60 represents the step of identifying the different system-specific formats of the client systems 2 to be integrated.

Box 61 represents the step of describing each client system 2 to be integrated with respect to the system-specific format and the system-specific structure of the respective client system 2, and storing this format and this structure in the database 32.

Box 62 represent the step of comparing the differences between the system-specific formats of the different client systems 2. If no such differences exists the process goes directly to box 64.

If such differences do exists, the process goes to box 63 representing the step of describing the software algorithms that perform the transformation of a system-specific format to another system-specific format and storing these software algorithms in the database 32.

Box 64 represents the step of deciding on the interfacing system-specific structure for the client adapters 5 and storing these structures in the database 32.

Box 65 represents the step of generating the source code files necessary for the database 9 comprised by the integrating server 4, the server adapters 6 and the client adapters 5 by means of the generating means 33.

Box 66 represents the step of implementing the source code files for the database 9 of the integrating server 4 in the database 9, implementing the source code files for the server adapters 6 on the integrating server 4, and implementing the source code files for the client adapters 5 on the respective client systems 2.

Box 67 represents the step of inserting an access means 8 into the respective client systems 2.

Box 68 represents the step of operating the arrangement of the different client systems 2.

The present invention is not limited to the embodiment described but may be varied and modified within the scope of the following claims.

What is claimed is:

1. A device for integrating an arrangement of a number of computerized essentially arbitrary client systems (2) including software and computer applications, being independent of each other, by permitting communication between the client systems (2), each client system (2) having a system-specific structure and being adapted to process information in a system-specific native format, wherein the device comprises an integrating server (4) and a number of communication connections for the exchange of a message, derived from the information, between the client systems (2) and said integrating server (4), each communication connection being provided to connect a client system (2) to said integrating server (4) and comprising a client adapter (5) adapted to the system-specific format and the system specific structure of the respective client system (2) for the exchange of said message in the system-specific native format and a server adapter (6) for the exchange of said message in the respective system-specific native format with said integrating server (4), said integrating server comprising a transformation means (15) arranged to transform said message published by a client system (2) in the system-specific native format to another system-specific format permitting subscription of said transformed message by any other of the client systems (2), and a tool (3) for staging the integration comprising:
means (31) for inputting a description (41-49) of each of the client systems,
means (32) for storing said description (41-49), and
means for generating in an automatic manner with the aid of said description (41-49) said transformation means of said integrating server, said client adapter (5) and said server adapter (6).

2. A device according to claim 1, wherein said client adapter (5) comprises at least one first adapter member (5') for transferring said message in the system-specific native format to a respective client system (2) and at least one second adapter member (5") for transferring said message in the native format from the respective client system (2).

3. A device according to claim 2, wherein said server adapter (6) comprises a first adapter member (6') for transferring said message in the system-specific native format from said integrating server (4) and a second adapter member (61") for transferring said message in the system-specific native format to said integrating server (4).

4. A device according to claim 2, wherein said client adapter (5) and said server adapter (6) of one communication connection are arranged to communicate with each other by means of an arbitrary data protocol.

5. A device according to claim 1, wherein each communication connection comprises an access means (8).

6. A device according to claim 1, wherein said storing means (32) comprises a primary database arranged to form said description (41-49) by a number of definitions.

7. A device according to claim 1, further comprising a manager unit (50) for monitoring the integrating server (4) and the client adapters (5).

8. A device according to claim 7, wherein said client adapter (5) comprises a control unit (51) connected to the manager unit (50) and provided for controlling the transfer of data through said client adapter (5).

9. A device according to claim 1, wherein said integrating server (4) comprises a secondary database (9) which contains a table means (10, 11) for each system-specific native format of the client systems (2) of the arrangement (1) and for each specific type of information to be communicated between client systems (2).

10. A device according to claim 9, wherein said transformation means (15) comprises at least one software algorithm (15), provided to transfer a message from one table means (10, 11) of one system-specific native format to another table means (10, 11) of another system-specific native format and thereby to transform the format of said message form said one system-specific format to another system-specific format.

11. A device according to claim 10, wherein each table means (10, 11) comprises tables rows which each contains a piece of information from one of the client systems.

12. A device according to claim 11, wherein at least one table means (10) comprises a history log table (13) storing all changes in a table row of said secondary database (9).

13. A device according to claim 11, wherein at least one table means (10) comprises an event log table (14) storing all operations concerning said respective table means (11).

14. A device according to claim 1, further comprising means (12) provided to detect a possible error in a message, means (6) permitting an error-containing message to be stored by said secondary database (9), and means (6) preventing the error-containing message from being transferred to another client system unless the error is corrected.

15. A device according to claims claim 14, wherein at least one table means (10) comprises a history log table (13) storing all changes in a table row of said secondary database, at least one table means (10) comprises an event log table (14) storing all operations concerning said respective table means (11), and wherein said detecting means is comprised by a trigger means (12) arranged to initiate storing of the error-containing message on said history log table (13) and on said event log table (14).

16. A device according to claim 15, wherein said permitting means and said preventing means are comprised by said server adapter (6).

17. A method of integrating an arrangement of a number of computerized essentially arbitrary client systems including software and computer applications, being independent of each other, by permitting communication between the client systems, each client system having a system-specific structure and being adapted to process information in a system-specific native format, comprising the steps of:

describing each of the client systems, storing said description, generating in an automatic manner by means of said description an integrating server comprising a transformation means arranged to transform a message published by a client system in the system-specific native format to another system-specific format permitting subscription of said transformed message by any other of the client systems, generating in an automatic manner by means of said description a number of communication connections for the exchange of said message between the client systems and the server, said communication connection comprising:

a client adapter adapted to the system-specific format and the system-specific structure of the respective client system for the exchange of said message in the system-specific native format, and a server adapter adapted to exchange said message in the respective system-specific native format with said integrating server, and operating the arrangement, whereby information in a system-specific format from one client system is processed in another system-specific format by another client system.

18. A method according to claim 17, wherein said client adapter and said server adapter communicate with each other by means of an arbitrary data protocol.

19. A method according to claim 17, wherein the client system is described by a number of definitions onto a said storing -means in the form of a primary database.

20. A method according to claim 17, comprising the further step of monitoring said integrating server and said client adapters by means of a manager unit.

21. A method according to claim 20, wherein a transfer of data through said client adapter is controlled by means of a control unit connected to said manager unit.

22. A method according to claim 17, further comprising the steps of implementing on the integrating server a secondary database and generating in said secondary database a table means for each system-specific native format of the client systems of the arrangement and for each specific type of information to be communicated between client systems.

23. A method according to claim 22, comprising the further step of transferring a message from one table means of one system-specific native format to another table means of another system-specific native format and thereby transforming the format of said message from said one system-specific format to another system-specific format.

24. A method according to claim 22, comprising the further step of generating a table means comprising a history log table storing all changes in a table row of said secondary database, and an event log table storing all operations concerning said respective table means.

25. A method according to claim 24, comprising the further steps of detecting a possible error in a message, storing the error-containing message in a table row of said history log table and in a table row of said event log table, and marking said table row to identify the error.

\* \* \* \* \*